Patented Nov. 15, 1927.

1,649,672

UNITED STATES PATENT OFFICE.

ALFRED R. L. DOHME, OF BALTIMORE, MARYLAND, ASSIGNOR TO SHARP & DOHME, INC., OF BALTIMORE, MARYLAND, A CORPORATION OF NEW JERSEY.

N-BUTYL RESORCINOL.

No Drawing.   Application filed January 16, 1925.  Serial No. 2,810.

This invention relates to a new product, namely, n-butyl resorcinol in a pure form. The new n-butyl resorcinol has the formula $C_6H_3(OH)_2CH_2CH_2CH_2CH_3$ and forms white crystals, and possesses value as a therapeutic agent.

The invention will be illustrated by the following specific example, but is not limited thereto.

80 parts of resorcinol are heated in an open vessel with 200 parts of pure normal butyric acid and 200 parts of zinc chloride until the reaction begins. The source of heat is then removed and the reaction permitted to continue until it ceases. Water is then added and a reddish oily substance separates out which is normal butyryl resorcinol, a ketone of the formula $$C_6H_3(OH)_2.COC_3H_7.$$

This product can be obtained in the form of white crystals melting at 68 to 69° C. when purified by recrystallization from a mixture of benzol and petroleum ether.

The oil is separated, purified by redistillation in vacuo, when it appears as a pure yellow oil. The oil is then mixed in a vessel supplied with a reflux condenser with zinc amalgam and dilute hydrochloric acid in the proportions of 50 parts of ketone, 200 parts of zinc amalgam and 600 parts of dilute hydrochloric acid and boiled for about ten hours or more. A reddish yellow oil separates out on the top of the liquid and is separated, redistilled in vacuo and recrystallized from benzol when it separates out in white crystals. This substance is normal butyl resorcinol which melts at 47–48° C. The product is slightly soluble in water, readily soluble in alcohol, benzol and vegetable oils. It is relatively non-toxic when given in proper doses internally and possesses valuable properties as an antiseptic and germicide, having a phenol coefficient of about 22.

I claim:

As a new product, pure n-butyl resorcinol having the formula $C_6H_3(OH)_2C_4H_9$, being a white crystalline substance having a melting point of 47–48° C., being slightly soluble in water and readily soluble in alcohol, benzol and vegetable oil.

In testimony whereof I affix my signature.

ALFRED R. L. DOHME.